US007885729B2

(12) United States Patent
Kuwahara et al.

(10) Patent No.: US 7,885,729 B2
(45) Date of Patent: Feb. 8, 2011

(54) VEHICLE INTEGRATED-CONTROL APPARATUS AND VEHICLE INTEGRATED-CONTROL METHOD

(75) Inventors: Seiji Kuwahara, Toyota (JP); Masato Kaigawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 921 days.

(21) Appl. No.: 11/792,138

(22) PCT Filed: Apr. 24, 2006

(86) PCT No.: PCT/IB2006/000974

§ 371 (c)(1),
(2), (4) Date: Jun. 1, 2007

(87) PCT Pub. No.: WO2006/114678

PCT Pub. Date: Nov. 2, 2006

(65) Prior Publication Data

US 2007/0293992 A1 Dec. 20, 2007

(30) Foreign Application Priority Data

Apr. 27, 2005 (JP) ............................ 2005-129924

(51) Int. Cl.
*G01D 1/00* (2006.01)
*G06F 17/00* (2006.01)

(52) U.S. Cl. ............................................ 701/1; 701/36

(58) Field of Classification Search .................. 701/36, 701/1

See application file for complete search history.

(56) References Cited

U.S. PATENT DOCUMENTS 6,076,500 A 6/2000 Clement et al.

(Continued)

FOREIGN PATENT DOCUMENTS

DE 195 36 038 A1 4/1997

(Continued)

OTHER PUBLICATIONS

Jul. 23, 2009 Office Action issued in German Patent Application No. 11 2006 001 068.9-26 (with translation).

*Primary Examiner*—Yonel Beaulieu
(74) *Attorney, Agent, or Firm*—Oliff & Berridge, PLC

(57) ABSTRACT

A control target value calculation portion (42) calculates a control target value for an engine (32) based on a control instruction amount requested by a driver, which is calculated by a driver's instruction amount calculation portion (14), and control instruction amounts requested by control units such as a driver support amount calculation portion (16) and a wheel stability control amount calculation portion (18). A horsepower conversion portion (44) converts the control target value into a control target horsepower. Meanwhile, an allowable horsepower range calculation portion (40) calculates a target instruction horsepower and an allowable horsepower range based on the information from the driver's instruction amount calculation portion (14). Even when an integrated-control involving multiple control units is performed, a monitor portion (46) determines whether the control target derived through conversion is within the allowable horsepower range. Thus, whether the control target is within the allowable horsepower range is easily and accurately determined, and control of a drive source of a vehicle is monitored.

14 Claims, 6 Drawing Sheets

U.S. PATENT DOCUMENTS

| | | | |
|---|---|---|---|
| 6,761,146 B1 | 7/2004 | Livshiz et al. | |
| 2004/0055567 A1 | 3/2004 | Doelker et al. | |
| 2005/0065678 A1 * | 3/2005 | Smith et al. | 701/29 |

FOREIGN PATENT DOCUMENTS

| | | | |
|---|---|---|---|
| DE | 197 39 565 A1 | | 3/1999 |
| DE | 103 51 047 | A1 | 6/2005 |
| JP | A 2003-191774 | | 7/2003 |
| JP | A 2003-254094 | | 9/2003 |
| JP | AU 2004 201 718 | B1 | 2/2005 |
| WO | WO 02/08595 | A1 | 1/2002 |

* cited by examiner

VEHICLE INTEGRATED-CONTROL APPARATUS AND VEHICLE INTEGRATED-CONTROL METHOD

The disclosure of Japanese Patent Application No. 2005-129924 filed on Apr. 27, 2005, including the specification, drawings and abstract is incorporated herein by reference in it entirety.

BACKGROUND OF THE INVENTION

1. Field of the Invention

The invention relates generally to a vehicle integrated-control apparatus and a vehicle integrated-control method. More specifically, the invention relates to refinements made to a function of monitoring a drive source of a vehicle in a vehicle integrated-control apparatus and method that controls control units of the vehicle in an integrated-manner.

2. Description of the Related Art

In recent years, almost all the vehicle controls are electronically performed. For example, the operating states of an accelerator pedal and a brake by a driver are detected by respective sensors, and various control units are driven based on the values detected by these sensors. For example, when the engine control is performed, an accelerator pedal operation amount achieved by the driver, namely, an accelerator angle is detected by, for example, an acceleration stroke sensor, and a target throttle angle is calculated based on the accelerator angle. Then, a throttle valve is opened or closed by driving a throttle motor based on the target throttle angle calculated. In such electronic throttle control, the throttle angle is controlled based on the accelerator pedal operation amount. As a result, the engine drive control is smoothly performed based on a driving force desired by the driver.

Also, in the electronic throttle control, a function of monitoring the accuracy of electronic control, that is, a function of monitoring whether an error is present in a calculation is employed. For example, an electronic control unit for a vehicle described in Japanese Patent Application Publication No. JP-A-2003-254094 sets an upper limit and a lower limit of the target throttle angle calculated based on the accelerator angle, and monitors whether an actual throttle angle is within the range between the upper limit and the lower limit. If the actual throttle angle is out of the range, the upper limit or the lower limit is used instead of the actual throttle angle. As a result, even if a calculation error occurs, the throttle angle is controlled within the appropriate allowable range. Accordingly, an inappropriate increase in an output from the engine can be avoided.

In recent years, various control units that control the behavior of a vehicle are mounted in the vehicle to smoothly operate the vehicle and alleviate a burden placed on the driver by driving the vehicle. The control units individually provide instructions, for example, driving force instructions, torque instructions, and throttle angle instructions, to an engine ECU. The engine ECU controls engine power to follow these instructions. Examples of the control units that control the behavior of the vehicle include control units that instruct the engine ECU to output power other than the power requested by depression of the accelerator pedal by the driver, when the cruise control is performed or when the vehicle is running on an uphill slope. In this case, these multiple control units are controlled in an integrated-manner by an integrated-control apparatus. The integrated-control apparatus is provided with not only the instruction concerning the driving force set based on the accelerator angle but also instructions from various driving force instruction sources such as a control unit that calculates a driving force based on set contents of the above-mentioned cruise control and reflects the driving force on the control; a control unit that calculates a driving force that needs to be added to run on an uphill slope and that reflects the driving force on the control; and a control unit that adjusts a driving force in order to suppress side skid of a wheel. The integrated-control apparatus then determines the actual throttle angle by appropriately coordinating the instruction values from the control units. Accordingly, the linkage between the accelerator angle and the throttle angle, which usually correspond to each other, weakens. This reduces reliability of monitoring the actual throttle angle using the allowable range for the target throttle angle calculated based on the accelerator angle.

SUMMARY OF THE INVENTION

The invention is made in light of the above-described circumstances. It is, therefore, an object of the invention to provide an integrated-control apparatus and method that can accurately determine whether a control target value such as a throttle angle is within an allowable range, even when multiple control units are controlled in an integrated-manner.

A first aspect of the invention relates to a vehicle integrated-control apparatus that controls, in an integrated manner, multiple control units which control a behavior of a vehicle. The vehicle integrated-control apparatus includes a detector that detects an operation amount of an operation member operated by a driver and detects a vehicle speed of the vehicle; and a controller that calculates a target instruction horsepower requested by the driver and an allowable horsepower range of the horsepower according to information based on the operation amount and the vehicle speed; calculates a control target value for a drive source of a vehicle according to the information based on the operation amount and an instruction from at least one of the multiple control units; converts the control target value into a control target horsepower; and monitors whether the control target horsepower is within the allowable horsepower range.

The multiple control units that control the behavior of the vehicle include, for example, a control unit that requests power for controlling automatic running, a control unit that requests power for adjusting a rate of increase in the output based on the speed at which an accelerator pedal is depressed, a control unit that requests power for controlling stability of rotation of wheels based on the ambient environment of the vehicle, a control unit that requests power for smoothing performing shifting of a transmission, and a control unit that requests power for stably performing a braking operation. In this case, the control units may be individually configured as described above. Alternatively, multiple configurations may be realized by one control unit or circuit. The allowable horsepower range with respect to the target instruction horsepower requested by the driver is set in advance depending on the performance of the vehicle, for example, at the vehicle design phase. Even when the horsepower fluctuates in the allowable horsepower range, the driver does not feel a sense of discomfort due to fluctuation in the horsepower that is caused independently of the operation by the driver, and the vehicle can run smoothly and safely.

A second aspect of the invention relates to a vehicle integrated-control method that controls, in an integrated-manner, multiple control units that control a behavior of a vehicle. The vehicle integrated-control method includes the steps of detecting an operation amount of an operation member operated by a driver; detecting a vehicle speed of the vehicle; calculating a target instruction horsepower requested by the driver and an allowable range of the horsepower according to information based on the operation amount and the vehicle speed; calculating a control target value for a drive source of a vehicle according to the information based on the operation amount and an instruction from at least one of the multiple control units; converting the control target value into a control target horsepower; and monitoring whether the control target horsepower is within the allowable horsepower range.

With the vehicle integrated-control apparatus and method, the control target value for the drive source of the vehicle is calculated according to the information based on the operation amount and an instruction from at least one of the multiple control units, and the control target value is converted into the control target horsepower. Meanwhile, the target instruction horsepower requested by the driver and the allowable horsepower range of the horsepower are calculated according to information based on the operation amount and the vehicle speed. Accordingly, even when the integrated-control involving multiple control units is performed, the control target value is converted into horsepower, and, it is, therefore, possible to determine whether the control target value is within the allowable range using the same unit as that of the allowable range. As a result, it is possible to easily and accurately determine whether the control target value is within the allowable range, and appropriately monitor the control of the drive source of the vehicle.

In the vehicle integrated-control apparatus according to the first aspect, the controller may convert the control target value into respective values expressed by different units, and outputting the respective values; the controller may convert the target values into horsepower; and the controller may monitor whether the each of the target values, which have undergone conversion into horsepower, is within the allowable horsepower range at a corresponding conversion phase.

The vehicle integrated-control method according to the second aspect may further include the steps of converting the control target value into values expressed by different units and outputting the values; converting the values into horsepower; and monitoring whether the each of the values which have undergone conversion is within the allowable horsepower range at a corresponding conversion phase.

With the vehicle integrated-control apparatus and method, even when a instruction is provided from the control units using a unit other than horsepower, the unit of the control target value is converted into the unit of the control instruction value from the control unit, and then the control target value is converted into horsepower. Then, it is determined whether the control target value expressed by horsepower is within the allowable horsepower range at each conversion phase. Accordingly, it is possible to further easily and accurately determine whether the control target value is within the allowable range.

In the vehicle integrated-control apparatus according to the first aspect, controller may calculate a reference driving force based on the operation amount and calculate a final target driving force by coordinating the reference driving force with an instruction driving force requested by at least one of the control units, and the controller may convert the final target driving force into horsepower using the vehicle speed.

The vehicle integrated-control method according to the second aspect may further include the steps of calculating a reference driving force based on the operation amount; calculating a final target driving force by coordinating the reference driving force with an instruction driving force requested by at least one of the control units; and converting the final target driving force into horsepower using the vehicle speed.

With the vehicle integrated-control apparatus and method, when an instruction is provided from the control unit using the unit of driving force, it is possible to easily determine whether the control target value is within the allowable range using the unit of horsepower.

In the vehicle integrated-control apparatus according to the first aspect, the controller may further calculate a target engine torque based on the final target driving force, and calculate a final target engine torque by coordinating the target engine torque with an engine torque requested by at least one of the control units, and the controller may convert the final target engine torque into horsepower using an engine speed.

The vehicle integrated-control method according to the second aspect may further include the steps of calculating a target engine torque based on the final target driving force; calculating a final target engine torque by coordinating the target engine torque with an engine torque requested by at least one of the control units; and converting the final target engine torque into horsepower using an engine speed.

With the vehicle integrated-control apparatus and method, when an instruction is provided from at least one of the control units using the unit of engine torque, it is possible to easily determine whether the control target value is within the allowable range using the unit of horsepower.

In the vehicle integrated-control apparatus according to the first aspect, the controller may further calculates a target throttle angle based on the final target engine torque, and calculates a final target throttle angle by coordinating the target throttle angle with a throttle angle requested by at least one of the control units, and the controller may convert the final target throttle angle into horsepower using an air-fuel ratio at the final target throttle angle.

The vehicle integrated-control method according to the second aspect may further include the steps of calculating a target throttle angle based on the final target engine torque; calculating a final target throttle angle by coordinating the target throttle angle with a throttle angle requested by at least one of the control units; and converting the final target throttle angle into horsepower using an air-fuel ratio at the final target throttle angle.

With the vehicle integrated-control apparatus and method, when an instruction is provided from at least one of the control units using the unit of throttle angle, it is possible to easily determine whether the control target value is within the allowable range using the unit of horsepower.

In the vehicle integrated-control apparatus according to the first aspect, when control target horsepower derived through conversion is out of the allowable horsepower range, the controller may use an upper limit or a lower limit of the allowable horsepower range instead of the control target horsepower derived through the conversion such that the control target horsepower is within the allowable horsepower range. When control target horsepower derived through conversion exceeds an upper limit of the allowable horsepower range, the monitor means may invalidate an instruction from at least one of the multiple control units, thereby bringing the control target horsepower within the allowable horsepower range.

The vehicle integrated-control method according to the second aspect may further include the step of using, when a control target horsepower derived through conversion is out of the allowable horsepower range, an upper limit or a lower limit of the allowable horsepower range instead of the control target horsepower derived through the conversion, thereby bringing the control target horsepower within the allowable horsepower range. Alternatively, the vehicle integrated-control method according to the second aspect may further include the step of invalidating, when a control target horsepower derived through conversion exceeds an upper limit of the allowable horsepower range, an instruction from at least one of the multiple control units, thereby bringing the control target horsepower within the allowable horsepower range.

With the vehicle integrated-control apparatus and method, even when an error is present in the instruction from the control unit and the control target horsepower is inappropriate, the control target horsepower can be easily changed to an appropriate value. Even when an error occurs in calculation by one of the control units, the vehicle can be controlled appropriately.

With the vehicle integrated-control apparatus and method according to the invention, it is possible to accurately monitor whether the control target value is within the allowable horsepower range, because the control target value is converted into horsepower and whether the control target value is within the allowable horsepower range is determined using the unit of horsepower.

BRIEF DESCRIPTION OF THE DRAWINGS

The features, advantages thereof, and technical and industrial significance of this invention will be better understood by reading the following detailed description of an example embodiment of the invention, when considered in connection with the accompanying drawings, in which.

DETAILED DESCRIPTION OF THE EXAMPLE EMBODIMENT

In the following description and the accompanying drawings, the invention will be described in more detail in terms of an example embodiment.

Even when multiple instructions are provided from respective control units, an integrated-control apparatus according to an embodiment of the invention converts all the instruction values to horsepower values, and determines whether each horsepower value is within an allowable horsepower range that is determined based on a target instruction horsepower requested by a driver. Accordingly, even when the integrated-control involving the multiple control units is performed, it is possible to appropriately monitor whether a control target value is within the allowable horsepower range.

Figure 1:
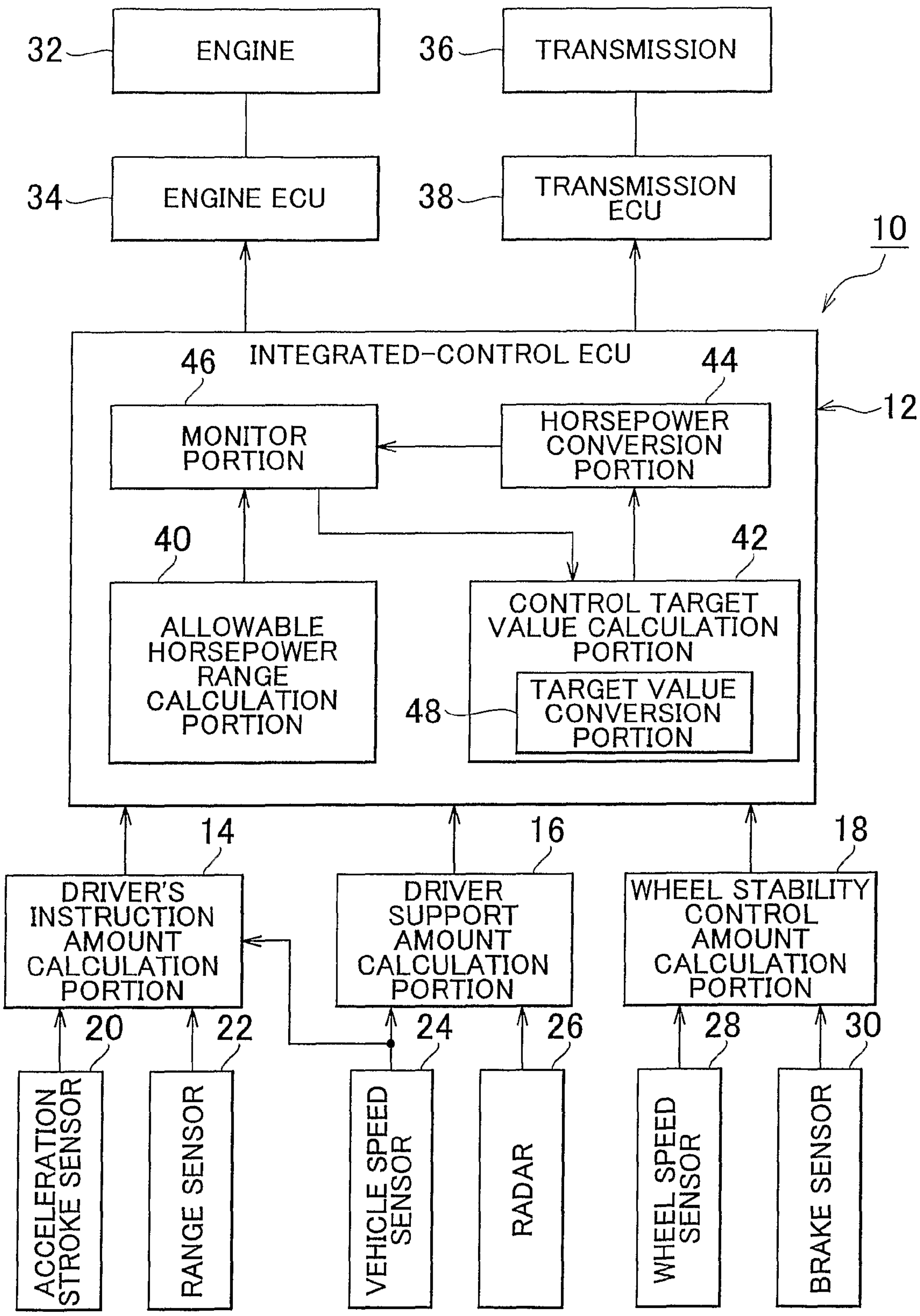
FIG. 1 illustrates the conceptual configuration of an integrated-control apparatus according to an embodiment of the invention.

FIG. 1 illustrates an integrated-control apparatus 10 according to the embodiment. The integrated-control apparatus 10 mainly includes an integrated-control ECU 12 that integrates instruction values provided from various control units that control the behavior of a vehicle. An instruction reception portion of the integrated-control ECU 12 receives instructions from various control units that control the behavior of the vehicle. The instruction reception portion is connected to the control units such as a driver's instruction amount calculation portion 14 that calculates a control instruction amount requested by the driver; a driver support amount calculation portion 16 that calculates a control instruction amount that is necessary to support or substitute the operation by the driver; and a wheel stability control amount calculation portion 18 that calculates a control instruction amount that is necessary to stably run the vehicle and suppress side skid and wheelspin of wheels.

For example, the driver's instruction amount calculation portion 14 is connected to an acceleration stroke sensor 20 that serves as operation amount detection means for detecting an operation amount of an operation member by the driver, a range sensor 22 that detects a shift range of a transmission, a vehicle speed sensor 24, and the like to recognize the control instruction amount requested by the driver. The driver support amount calculation portion 16 is connected to the vehicle speed sensor 24 and radar 26 that can obtain necessary information to fulfill the functions to support the driver such as an automatic cruise function, an adaptive cruise function, and a collision avoidance function. Also, the wheel stability control amount calculation portion 18 is connected to a wheel speed sensor 28 and a brake sensor 30 that detect a wheel state.

An output portion of the integrated-control ECU 12 is connected to an engine ECU 34 that directly controls an engine 32 serving as a drive source of the vehicle and a transmission ECU 38 that controls a shift speed of a transmission 36.

The integrated-control ECU 12 includes an allowable horsepower range calculation portion 40 that calculates a target instruction horsepower requested by the driver and an allowable range of the target instruction horsepower based on an accelerator stroke and a vehicle speed indicated by the signals from the driver's instruction amount calculation portion 14; a control target value calculation portion 42 that calculates an engine control target value according to the information based on the accelerator pedal operation amount and an instruction from at least one of the multiple control units; a horsepower conversion portion 44 that converts the control target value into horsepower (power) which is an evaluation standard unit uniformly used in the embodiment; and a monitor portion 46 that monitors whether the horsepower derived through the conversion, that is, the control target horsepower is within the allowable horsepower range calculated by the allowable horsepower range portion 40.

Figure 2:
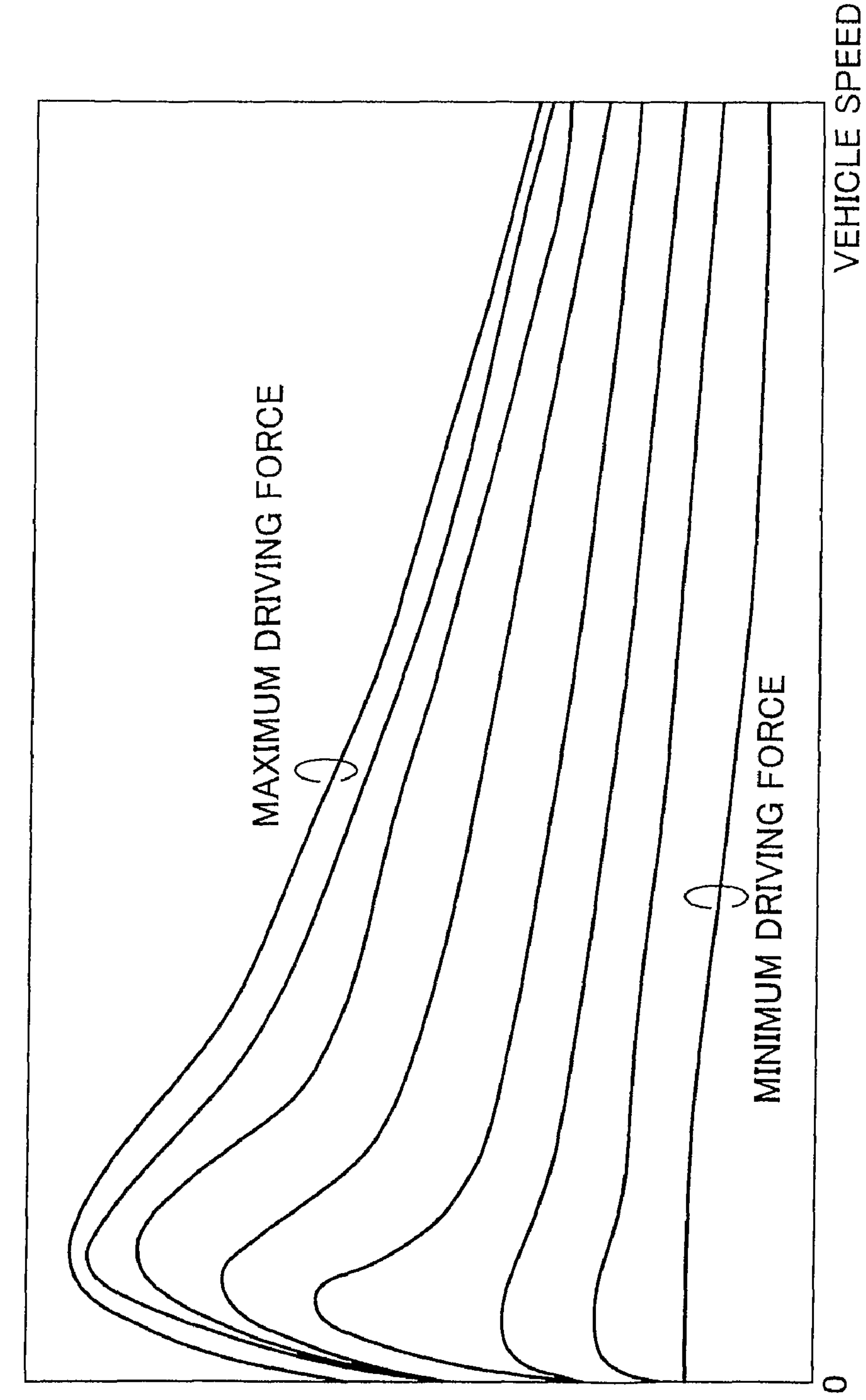
FIG. 2 illustrates an example of a map showing the relationship among an accelerator angle, a vehicle speed, and horsepower, which is used to calculate a target instruction horsepower in the embodiment.

The allowable horsepower range calculation portion 40 calculates horsepower that the driver expects to obtain by performing the current operation, that is, a target instruction horsepower requested by the driver based, for example, on the accelerator angle and the current vehicle speed. In this case, the target instruction horsepower may be calculated using the map that defines the relationship, expressed by curved lines, between the accelerator stroke, the vehicle speed, and the horsepower, as shown in FIG. 2. This map may be set at the vehicle design phase. At the vehicle design phase, an allowable range of the horsepower fluctuation may be also set. Even when horsepower that is actually generated in the vehicle fluctuates with respect to horsepower requested by the driver by depressing the accelerator pedal, if the fluctuation is within the allowable range, the driver does not feel a sense of discomfort. Generally, the driver does not feel a sense of discomfort if the horsepower fluctuates within the range of, for example, from +10% to −20% with respect to the horsepower obtained at the accelerator angle of 80%. Namely, in the case where the driver has recognized the feel of horsepower obtained at the accelerator angle of 80%, even if the actual horsepower fluctuates for some reasons within the range from +10% to −20% with respect to the recognized horsepower, the driver does not feel the fluctuation as a sense of discomfort. The allowable range is individually set depending on vehicle models and grades. Therefore, when the driver's instruction amount calculation portion 14 provides the information such as the current accelerator angle and vehicle speed, the allowable range for the actual horsepower with respect to the horsepower currently requested by the driver can be calculated.

The control target value calculation portion 42 calculates the control target value of the engine 32 based on the driver's control instruction value provided from the driver's instruction amount calculation portion 14 and control instruction values provided from the other control units such as the driver support amount calculation portion 16 and the wheel stability control amount calculation portion 18. For example, when a driving force of 100N is requested by the driver's instruction amount calculation portion 14 and a driving force of 20N in total is requested by the driver support amount calculation portion 16 and the wheel stability control amount calculation portion 18, the control target value calculation portion 42 sets the control target value to 120 N. Namely, in the case where control instruction values are individually input by the multiple control units, when the above-mentioned control target value is set, a known coordination process, for example, a maximum/minimum coordination process is performed.

The control instruction values from the driver support amount calculation portion 16 and the wheel stability control amount calculation portion 18 are not always expressed by the same unit of physical quantity. For example, the control instruction value may be requested using the unit of driving force, the unit of engine torque, or the unit of throttle angle. Accordingly, the control target value calculation portion 42 includes a target value conversion portion 48 that converts the units of the control values used in the control target value calculation portion 42 into the unit of control instruction values from the various control units.

Figure 3:
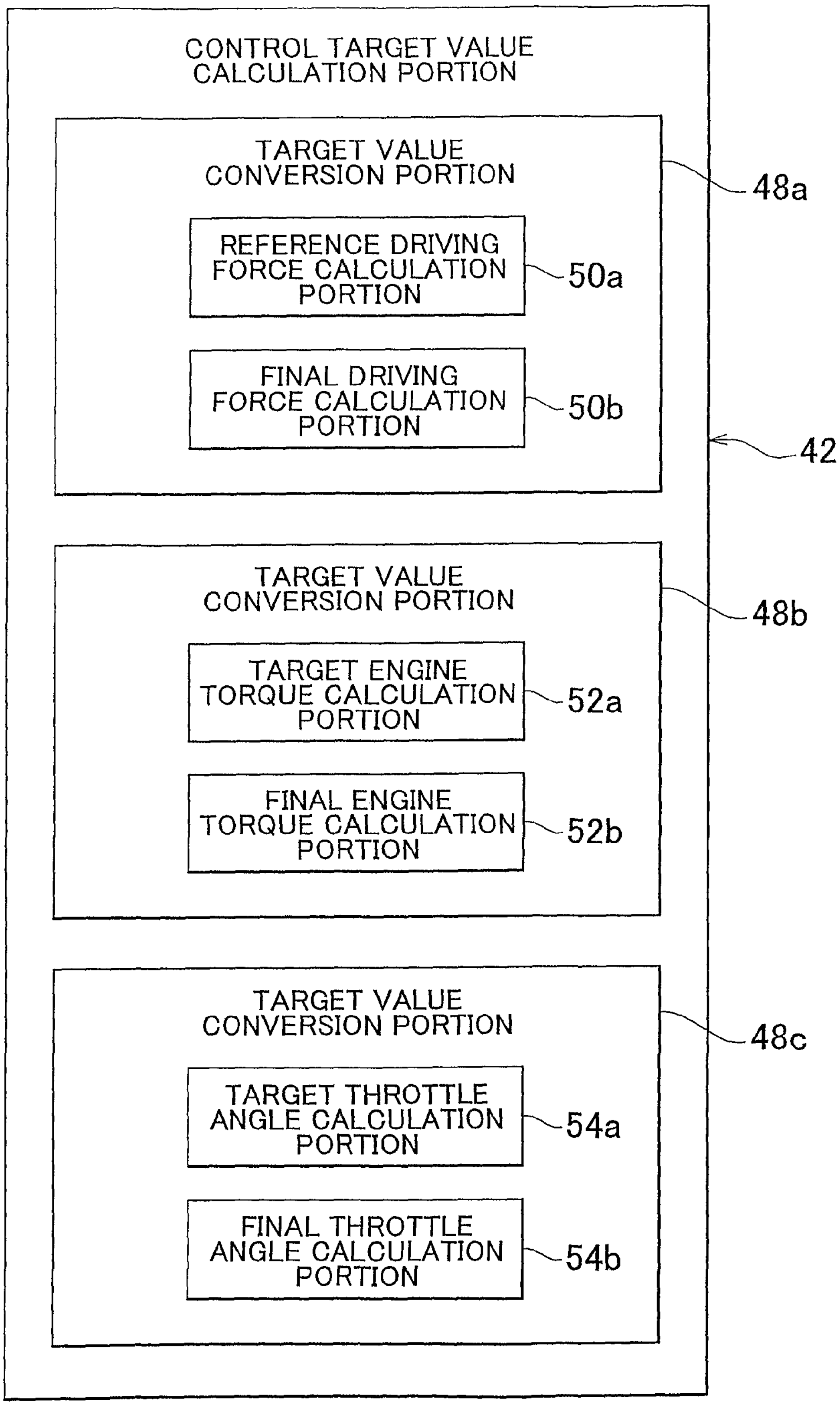
FIG. 3 illustrates the detailed configuration of a target value conversion portion of a control target value calculation portion in the embodiment.

FIG. 3 illustrates the detailed configuration of the target value conversion portion 48 of the control target value calculation portion 42. For example, when the control instruction values provided to the control target value calculation portion 42 from the control units such as the driver's instruction amount calculation portion 14, the driver support amount calculation portion 16, and the wheel stability control amount calculation portion 18 are expressed by the unit of driving force, a target value conversion portion 48*a* operates. In the target value conversion portion 48*a*, a reference driving force calculation portion 50*a* calculates a reference driving force based on the operation amount indicated by the signal from the driver's instruction amount calculation portion 14, and a final driving force calculation portion 50*b* calculates a final target driving force by coordinating the reference driving force with the instruction driving force indicated by the signal from one of the control units, for example, the driving force that is requested when the driving force needs to be increased in advance, for example, to run on an uphill-slope, or when the driving force needs to be reduced in advance, for example, before the starting point of a curve.

Similarly, when the control instruction values provided to the control target value calculation portion 42 from the control units such as the driver's instruction amount calculation portion 14, the driver support amount calculation portion 16, and the wheel stability control amount calculation portion 18 are expressed by the unit of engine torque, the target value conversion portion 48*b* operates. In the target value conversion portion 48*b*, a target engine torque calculation portion 52*a* calculates the target engine torque based on the final target driving force calculated by the final driving force calculation portion 50*b*. In this case, when the monitor portion 46 performs a guard process, described later in detail, the target engine torque is calculated based on the final target driving force derived through the guard process. A final engine torque calculation portion 52*b* calculates the final target engine torque by coordinating the calculated target engine torque with the engine torque requested by at least one of the control units, for example, the engine torque that is requested during the engine speed control at the time of downshifting or the smoothing control for reducing a shock due to backlash. When the target engine torque calculation portion 52*a* calculates the engine torque based on the driving force, the engine torque is generally calculated according to the following equation;

engine torque=driving force×tire radius/differential ratio/speed ratio/torque ratio of torque converter/efficiency.

When the control instruction values that are provided to the control target value calculation portion 42 from the control units such as the driver's instruction amount calculation portion 14, the driver support amount calculation portion 16, and the wheel stability control amount calculation portion 18 are expressed by the unit of throttle angle, a target value conversion portion 48 operates. In the target value conversion portion 48*c*, a target throttle angle calculation portion 54*a* calculates the target throttle angle based on the final target engine torque calculated by the final engine torque calculation portion 52*b*. In this case, when the monitor portion 46 performs the guard process, described later in detail, the target throttle angle is calculated based on the final target engine torque derived through the guard process. The final throttle angle calculation portion 54*b* calculates the final target throttle angle by coordinating the calculated target throttle angle with the throttle angle requested by at least one of the control units, for example, the throttle angle requested for output control performed in order to control exhaust gas and prevent damage of components in the engine.

The horsepower conversion portion 44 converts the control target value calculated by the control target value calculation portion 42 into horsepower such that the monitor portion 46 can determine whether the control target value is within the allowable horsepower range calculated by the allowable horsepower range calculation portion 40. For example, when receiving the signal indicating the final target driving force from the control target value calculation portion 42, the horsepower conversion portion 44 calculates the horsepower by multiplying the final target driving force by the vehicle speed, and sends the signal indicating the calculated horsepower to the monitor portion 46. When receiving the signal indicating the final target engine torque from the control target value calculation portion 42, the horsepower conversion portion 44 calculates the horsepower by multiplying the final target engine torque by the engine speed, and sends the signal indicating the calculated horsepower to the monitor portion 46. When receiving the signal indicating the final target throttle angle from the control target value calculation portion 42, the horsepower conversion portion 44 converts the final target throttle angle into the horsepower, and sends the signal indicating the horsepower to the monitor portion 46. The throttle angle can be converted into horsepower using the maps shown in FIGS. 4 and 5. Namely, the final target throttle angle is converted into the horsepower using the air-fuel ratio at the final target throttle angle. First, the intake air amount is calculated based on the final target throttle angle and the engine speed detected at this final target throttle angle, using the map shown in FIG. 4. Next, based on the intake air amount obtained using the map in FIG. 4 and the engine speed at this intake air amount, the horsepower that is generated when the air-fuel mixture, formed of fuel and the air taken in through throttle valve with this throttle angle, is burned, using the map shown in FIG. 5. In this case, the horsepower is calculated according to the following equation;

$$\text{horsepower}=(\text{axial torque}+\text{friction})\times\text{engine speed}.$$

Figure 4:
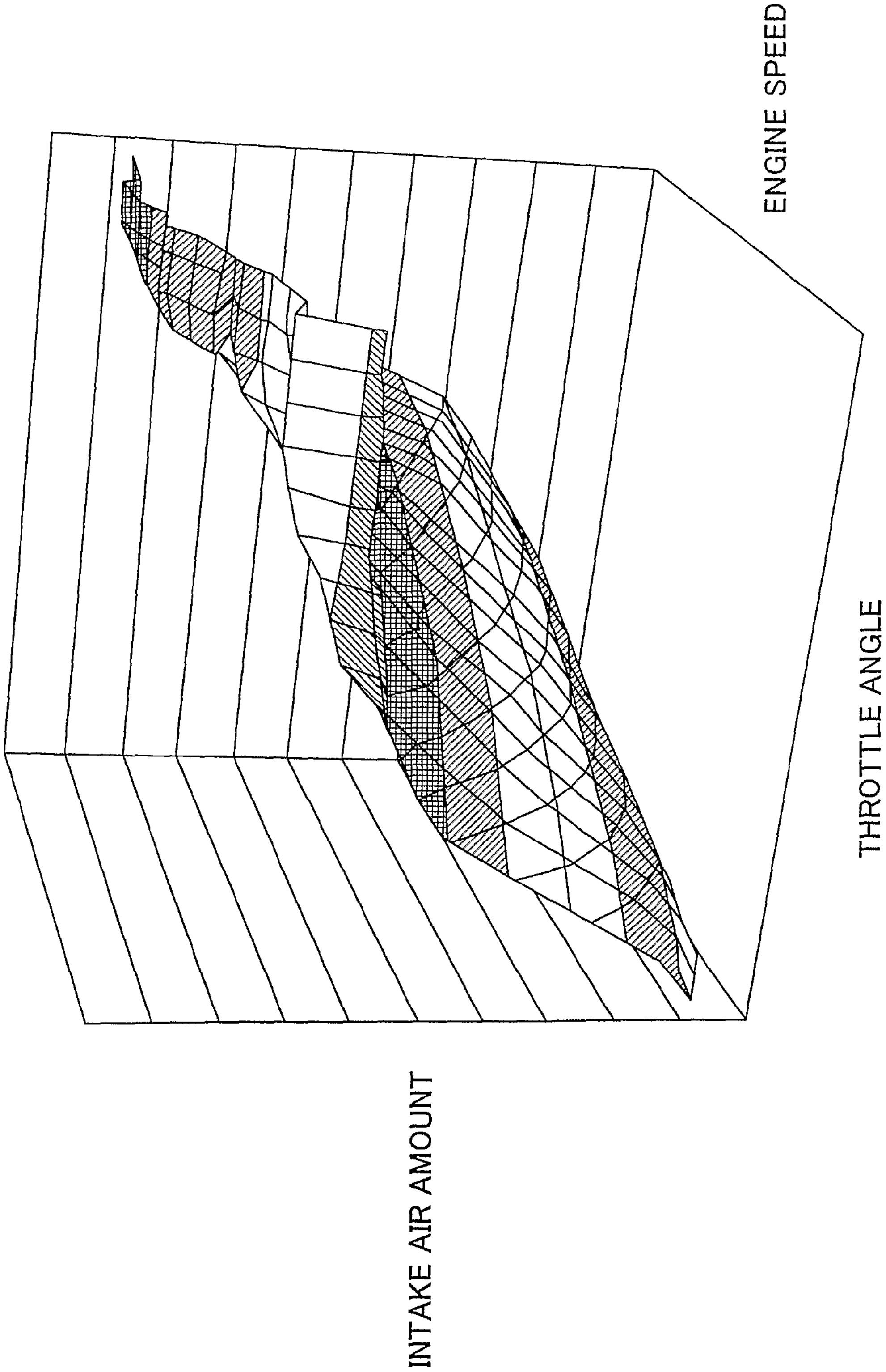
FIG. 4 illustrates an example of a map used for calculate an intake air amount based on a throttle angle and an engine speed.
Figure 5:
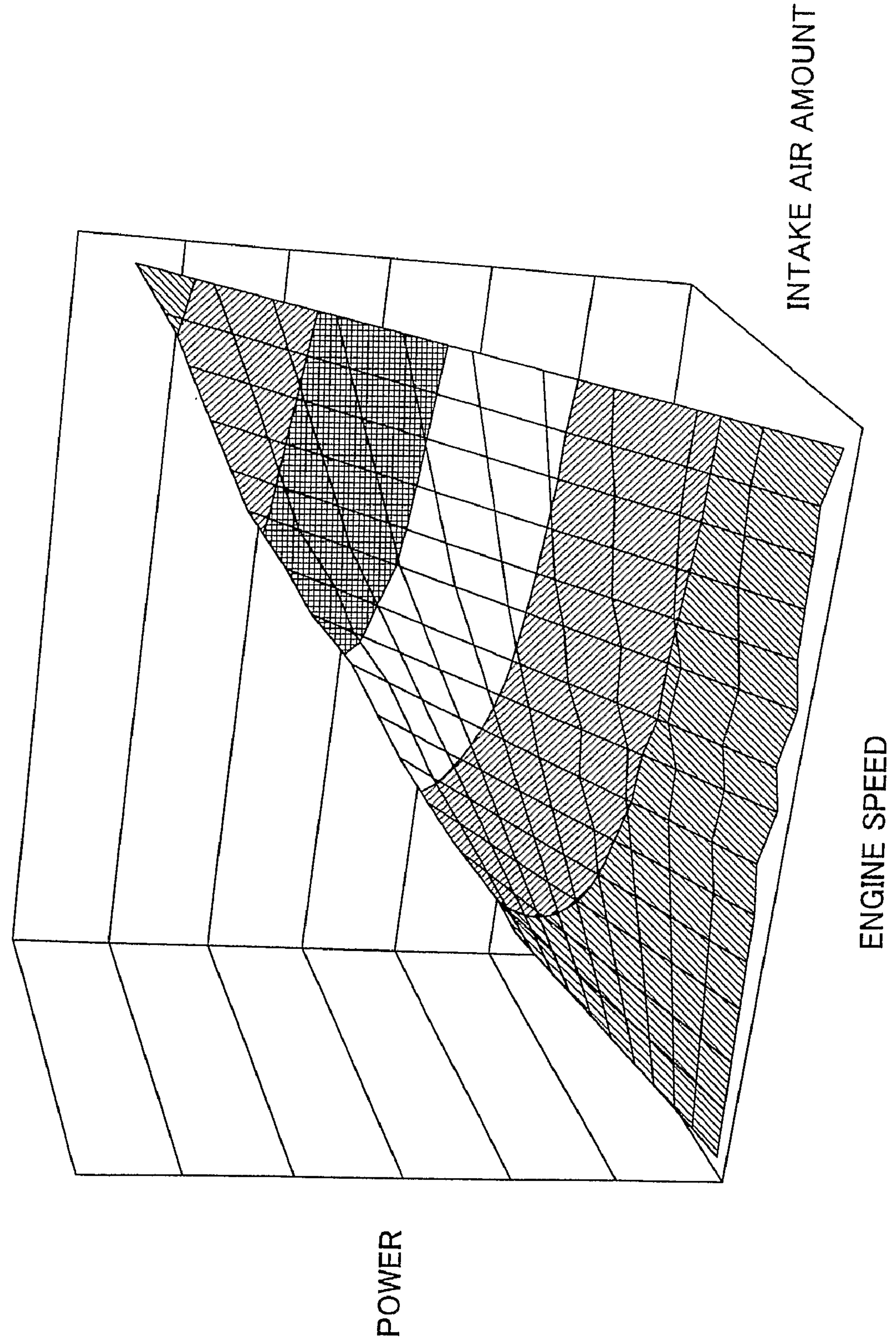
FIG. 5 illustrates an example of a map used to derive, based on the intake air amount calculated from the map in FIG. 4 and the engine speed at the this intake air amount, horsepower that is generated when an air-fuel mixture, formed of fuel and air taken in through a throttle valve with the throttle angle, is burned in the embodiment.

The maps shown in FIGS. 4 and 5 may be prepared in advance based on the results of experiments and analysis.

The monitor portion 46 determines whether a physical quantity is within the allowable range. The physical quantity that will undergo determination by the monitor portion 46 is converted into the horsepower. The driving force is multiplied by the vehicle speed to be converted into horsepower. The output torque is multiplied by the output rotational speed to be converted into horsepower. The turbine torque is multiplied by the turbine speed to be converted into horsepower. The engine torque is multiplied by the engine speed to be converted into horsepower. The throttle angle is converted into horsepower based on the engine speed and the throttle angle. Various units of physical quantities are converted into the same unit, and determination whether the value is within the allowable range is made using the same unit.

The monitor portion 46 outputs the results of determinations as to whether the values are within the allowable range. When the control target horsepower indicated by the signal from the horsepower conversion portion 44 is out of the allowable range indicated by the signal from the allowable horsepower range calculation portion 40, the monitor portion 46 performs the guard process such that the control target horsepower is within the allowable horsepower range. For example, if the control target horsepower is higher than the upper limit of the allowable horsepower range, the monitor portion 46 uses the upper limit instead of the actual control target horsepower. On the other hand, if the control target horsepower is lower than the lower limit of the allowable horsepower range, the monitor portion 46 uses the lower limit instead of the actual control target horsepower. Thus, the monitor portion 46 keeps the control target horsepower within the allowable horsepower range. If the control target horsepower derived through the conversion by the horsepower conversion portion 44 exceeds the upper limit of the allowable horsepower range, the monitor portion 46 may invalidate at least one of the instructions provided from the multiple control units to the control target value calculation portion 42, thereby keeping the control target horsepower within the allowable horsepower range.

When the monitor portion 46 determines that the horsepower based on the final target throttle angle is within the allowable range, the integrated-control ECU 12 provides the signal indicating the set throttle angle to the engine ECU 34, and controls the engine 32. At the same time, the integrated-control ECU 12 provides the transmission ECU 38 with a control signal for selecting the optimum shift speed such that the optimum horsepower based on the set throttle angle can be output.

Figure 6:
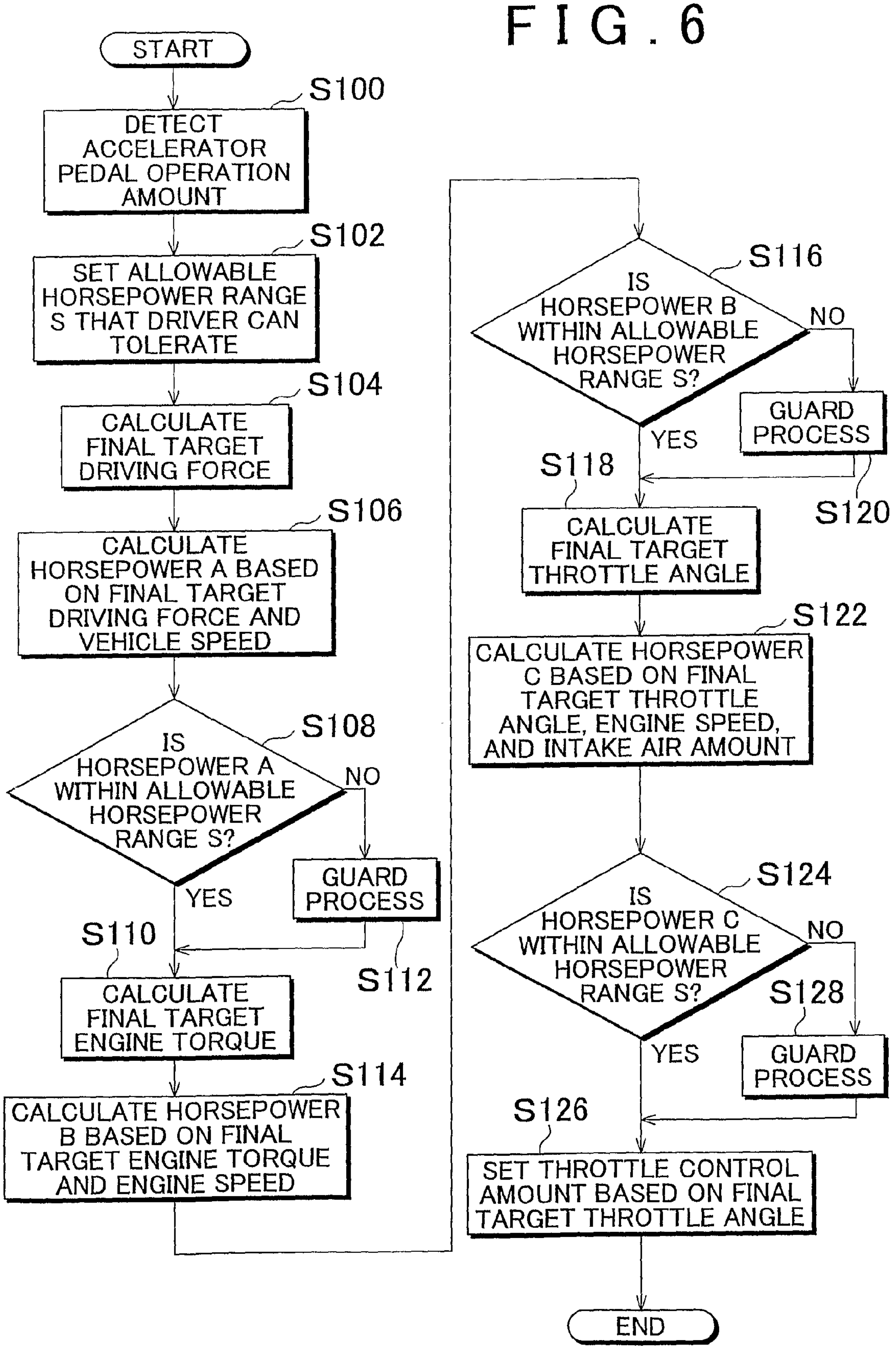
FIG. 6 illustrates the flowchart of a control routine performed by the integrated-control apparatus according to the invention.

The control routine performed by the integrated-control apparatus 10 thus configured will be described with reference to the flowchart shown in FIG. 6. The integrated-control apparatus 10 starts the control with, for example, an ignition key turned ON. The integrated-control apparatus 10 detects the accelerator pedal operation amount using the acceleration stroke sensor 20 and the driver's instruction amount calculation portion 14 at predetermined intervals (S100). Next, the allowable horsepower range calculation portion 40 sets an allowable horsepower range S, which the driver can tolerate, with respect to the accelerator pedal operation amount (S102). The control target value calculation portion 42 calculates the final target driving force by coordinating the driving force with instruction values from the driver's instruction amount calculation portion 14, the driver support amount calculation portion 16, the wheel stability control amount calculation portion 18, and the like (S104). Then, the horsepower conversion portion 44 converts the final target driving force into horsepower A (S106).

Next, the monitor portion 46 determines whether the horsepower A indicated by the signal from the horsepower conversion portion 44 is within the allowable horsepower range S indicated by the signal from the allowable horsepower range calculation portion 40 (S108). If it is determined in step S108 that the horsepower A is within the allowable range S ("YES" in step S108), the signal indicating the final target driving force calculated in step S104 is returned to the control target value calculation portion 42, and the final target driving force is converted into the engine torque by the target engine, torque calculation portion 52*a* of the control target value calculation portion 42. If the control instruction values are provided from, for example, the driver support amount calculation portion 16 and the wheel stability control amount calculation portion 18 using the unit of engine torque, the final engine torque calculation portion 52*b* calculates the final target engine torque by coordinating the engine torque converted from the final target driving force with these control instruction values (S110).

On the other hand, if it is determined in step S108 that the horsepower A is out of the allowable range S ("NO" in step S108), the monitor portion 46 performs the guard process (S112). As described above, in the guard process, if the horsepower A is higher than the upper limit or lower than the lower limit of the allowable range S, the upper limit or the lower limit of the allowable range S is used as the horsepower A instead of the actual horsepower A, respectively. Alternatively, if the horsepower A exceeds the upper limit of the allowable range S, one of the control instruction values from the driver support amount calculation portion 16 and the wheel stability control amount calculation portion 18 is invalidated, and the horsepower A based on the driving force is kept within the allowable range S. The horsepower A derived through the guard process is re-converted into the target driving force. Then, the final target engine torque is calculated in step S110. Namely, the final target driving force derived through the guard process is converted into the engine torque by the target engine torque calculation portion 52*a*. Also, when the control instruction values are provided from the driver support amount calculation portion 16 and the wheel stability control amount calculation portion 18 using the unit of engine torque, the final engine torque calculation portion 52*b* calculates the final target engine torque by coordinating the engine torque converted from the final target driving force with these control instruction values.

When the final target engine torque is calculated, the horsepower conversion portion 44 calculates horsepower B based on the engine torque by multiplying the final target engine torque by the engine speed (S114).

As described above, the monitor portion 46 determines whether the horsepower B indicated by the signal from the horsepower conversion portion 44 is within the allowable horsepower range S indicated by the signal from the allowable horsepower range calculation portion 40 (S116). If it is determined in step S116 that the horsepower B is within the allowable range S ("YES" in step S116), the signal indicating the final target engine torque calculated in step S110 is returned to the control target value calculation portion 42. Then, the final target engine torque is converted into the throttle angle by the target throttle angle calculation portion 54*a* of the control target value calculation portion 42. If the control instruction values are provided from, for example, the driver support amount calculation portion 16 and the wheel stability control amount calculation portion 18 using the unit of throttle angle, the final throttle angle calculation portion 54*b* calculates the final target throttle angle by coordinating the throttle angle converted from the final target engine torque with these instruction values (S118).

On the other hand, if it is determined in step S116 that the horsepower B is out of the allowable range S ("NO" in step S116), the monitor portion 46 performs the guard process (S120). In this guard process as well, if the horsepower B is out of the allowable range S, the upper limit or the lower limit of the allowable range S is used instead of the actual horsepower B. Alternatively, at least one of the control instruction values from the control units is invalidated. Thus, the horsepower B based on the engine torque is kept within the allowable range S. The horsepower B derived through the guard process is re-converted into the target throttle angle. Then, the final target throttle angle is calculated in step S118. Namely, the final target engine torque derived through the guard process is converted into the throttle angle by the target throttle angle calculation portion 54*a*. When the control instruction values are provided from, for example, the driver support amount calculation portion 16 and the wheel stability control amount calculation portion 18 using the unit of throttle angle, the final throttle angle calculation portion 54*b* calculates the final target throttle angle by coordinating the throttle angle converted from the final target engine torque with these control instruction values.

After the final target throttle angle is calculated, the horsepower conversion portion 44 calculates horsepower C based on the throttle angle, according to the final target throttle angle, the engine speed, and the intake air amount (S122).

As described above, the monitor portion 46 determines whether the horsepower C indicated by the signal from the horsepower conversion portion 44 is within the allowable horsepower range S indicated by the signal from the allowable horsepower range calculation portion 40 (S124). If it is determined in step S124 that the horsepower C is within the allowable range S ("YES" in S122), the integrated-control ECU 12 sets the throttle control amount to be provided to the engine ECU 34 based on the final target throttle angle calculated in step S118 (S126), and then ends the control routine.

On the other hand, if it is determined in step S124 that the horsepower C is out of the allowable range S ("NO" in S124), the monitor portion 46 performs the guard process (S128). In this guard process as well, if the horsepower C is out of the allowable range S, the upper limit or the lower limit of the allowable range S is used instead of the actual horsepower C. Alternatively, at least one of the control instruction values from the control units is invalidated. Thus, the horsepower based on the throttle angle is kept within the allowable range S. The horsepower derived through the guard process is re-converted into the target throttle angle. Then, in step S126, the integrated-control ECU 12 sets the throttle valve control amount to be provided to the engine ECU 34 based on the final target throttle angle derived through the guard process (S126), and then ends the control routine.

As described so far, the target horsepower is calculated based on the accelerator stroke and the vehicle speed, and the upper limit and the lower limit of the allowable range are calculated based on the target horsepower value. Also, the target control values derived in consideration of the control instruction values from the various control units, for example, target driving force, the target engine torque, and the target throttle angle are all converted into horsepower. Then, it is determined whether each of the control target values is within the allowable range. Accordingly, it is possible to easily and promptly determine whether each of the values derived in consideration of the control amounts indicated by the instructions from the control units is within the allowable range defined based on the accelerator stroke. Then, it is possible to monitor whether the instructions from the control units are appropriately provided, or whether an error is present in the calculation of the control value. Also, whether the value is within the allowable range is monitored each time a control instruction is provided in the process of calculating the throttle angle based on the accelerator stroke. Accordingly, accuracy in monitoring the electronic throttle control easily improves.

FIG. 1 in the embodiment illustrates an example of the integrated-control. As long as the integrated-control relates to the engine control, modifications may be made to the control units that provide the signals indicating the control instruction amounts and the control units that provide the output values based on the instruction control, as required. Even with such modifications, the same effects as those in the embodiment can be obtained. In FIG. 1, the internal configuration of the integrated-control apparatus 10 are grouped by functions. However, if the same functions can be fulfilled, modifications may be made to the configurations, as required. Even if the multiple functions are performed by one calculation portion, the same effects as those in the embodiment can be obtained.

What is claimed is:

1. A vehicle integrated-control apparatus that controls multiple control units which control a behavior of a vehicle, comprising:

a detector that detects an operation amount of an operation member operated by a driver and detects a vehicle speed of the vehicle; and a controller that calculates a target instruction horsepower requested by the driver and an allowable horsepower range of the horsepower according to information based on the operation amount and the vehicle speed;

calculates a control target value for a drive source of the vehicle according to the information based on the operation amount and an instruction from at least one of the multiple control units, converts the control target value into a control target horsepower, and monitors whether the control target horsepower is within the allowable horsepower range.

2. The vehicle integrated-control apparatus according to claim 1, wherein the controller converts the control target value into respective values expressed by different units, and outputting the respective values;

converts the values output from the controller into horsepower, and monitors whether the each of the values, which are output from the controller and which have undergone conversion by the controller, is within the allowable horsepower range at a corresponding conversion phase.

3. The vehicle integrated-control apparatus according to claim 1, wherein the controller calculates a reference driving force based on the operation amount, and calculates a final target driving force by coordinating the reference driving force with an instruction driving force requested by at least one of the control units, and the controller converts the final target driving force into horsepower using the vehicle speed.

4. The vehicle integrated-control apparatus according to claim 3, wherein the controller further in calculates a target engine torque based on the final target driving force, and calculates a final target engine torque by coordinating the target engine torque with an engine torque requested by at least one of the control units, and the controller converts the final target engine torque into horsepower using an engine speed.

5. The vehicle integrated-control apparatus according to claim 4, wherein the controller further calculates a target throttle angle based on the final target engine torque, and calculates a final target throttle angle by coordinating the target throttle angle with a throttle angle requested by at least one of the control units, and the controller converts the final target throttle angle into horsepower using an air-fuel ratio at the final target throttle angle.

6. The vehicle integrated-control apparatus according to claim 1, wherein, when control target horsepower derived through conversion by the controller is out of the allowable horsepower range, the controller uses an upper limit or a lower limit of the allowable horsepower range instead of the control target horsepower derived through the conversion such that the control target horsepower is within the allowable horsepower range.

7. The vehicle integrated-control apparatus according to claim 1, wherein, when control target horsepower derived through conversion by the controller exceeds an upper limit of the allowable horsepower range, the controller invalidates an instruction from at leak one of the multiple control units, thereby bringing the control target horsepower within the allowable horsepower range.

8. A vehicle integrated-control method that controls multiple control units that control a behavior of a vehicle, comprising:

detecting an operation amount of an operation member operated by a driver;

detecting a vehicle speed of the vehicle;

calculating a target instruction horsepower requested by the driver and an allowable range of the horsepower according to information based on the operation amount and the vehicle speed;

calculating a control target value for a drive source of the vehicle according to the information based on the operation amount and an instruction from at least one of the multiple control units;

converting the control target value into a control target horsepower; and monitoring whether the control target horsepower is within the allowable horsepower range.

9. The vehicle integrated-control method according to claim 8, further comprising:

converting the control target value into values expressed by different units, and outputting the values;

converting the values into horsepower; and monitoring whether the each of the values which have undergone conversion is within the allowable horsepower range at a corresponding conversion phase.

10. The vehicle integrated-control method according to claim 8, further comprising:

calculating a reference driving force based on the operation amount;

calculating a final target driving force by coordinating the reference driving force with an instruction driving force requested by at least one of the control units (S104); and converting the final target driving force into horsepower using the vehicle speed (S106).

11. The vehicle integrated-control method according to claim 10, further comprising:

calculating a target engine torque based on the final target driving force;

calculating a final target engine torque by coordinating the target engine torque with an engine torque requested by at least one of the control units; and converting the final target engine torque into horsepower using an engine speed.

12. The vehicle integrated-control method according to claim 11, characterized by further comprising:

calculating a target throttle angle based on the final target engine torque;

calculating a final target throttle angle by coordinating the target throttle angle with a throttle angle requested by at least one of the control units; and converting the final target throttle angle into horsepower using an air-fuel ratio at the final target throttle angle.

13. The vehicle integrated-control method according to claim 8, further comprising:

using, when a control target horsepower derived through conversion is out of the allowable horsepower range, an upper limit or a lower limit of the allowable horsepower range instead of the control target horsepower derived through the conversion, thereby bringing the control target horsepower within the allowable horsepower range.

14. The vehicle integrated-control method according to claim 8, characterized by further comprising:

invalidating, when a control target horsepower derived through conversion exceeds an upper limit of the allowable horsepower range, an instruction from at least one of the multiple control units, thereby bringing the control target horsepower within the allowable horsepower range.

* * * * *